UNITED STATES PATENT OFFICE.

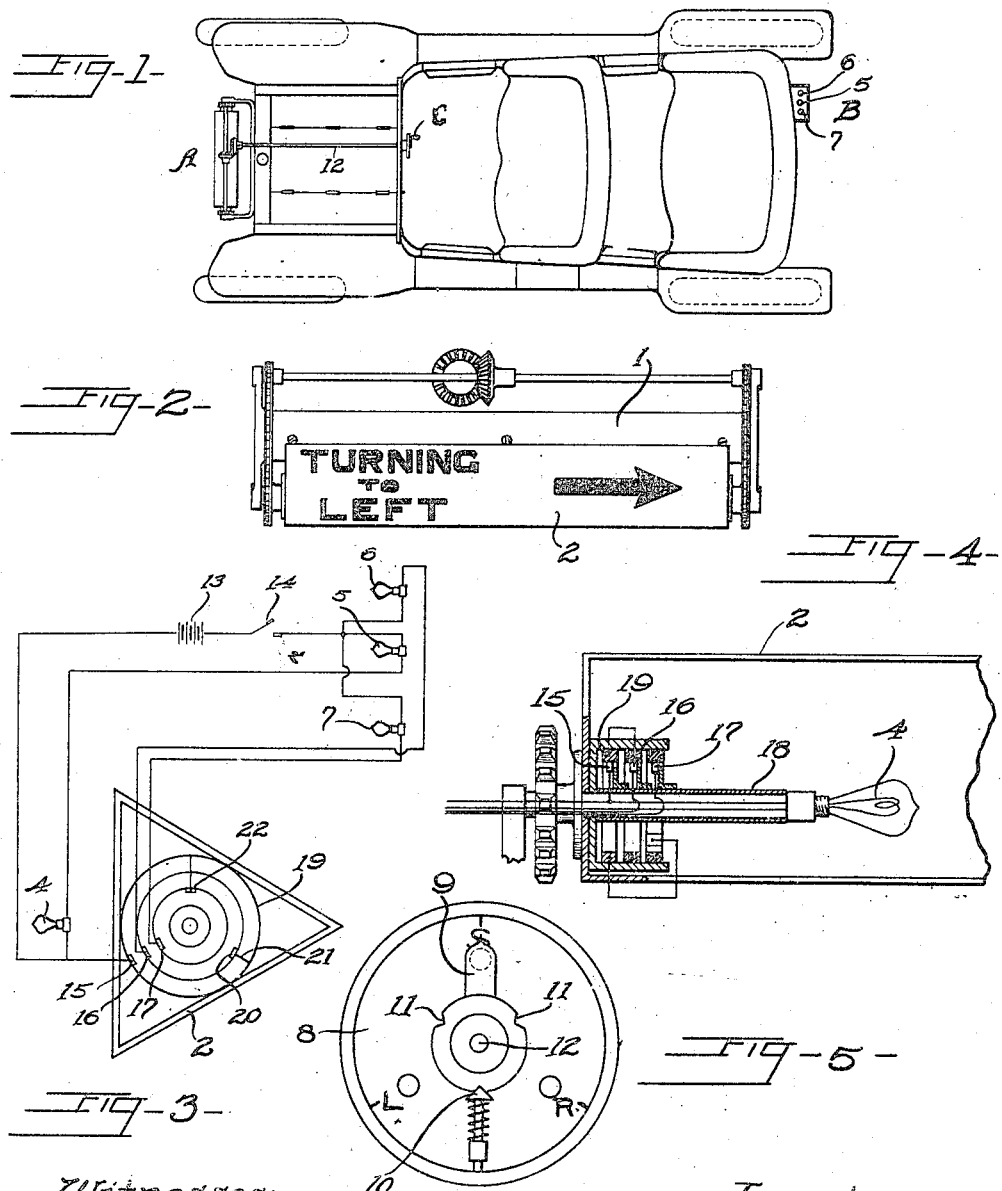

JOSEPH L. CAYER, OF CHICAGO, ILLINOIS.

AUTOMOBILE SIGNALING APPARATUS.

1,081,433. Specification of Letters Patent. Patented Dec. 16, 1913.

Application filed October 16, 1912. Serial No. 726,040.

*To all whom it may concern:*

Be it known that I, JOSEPH L. CAYER, a citizen of the United States of America, and a resident of Chicago, county of Cook, State of Illinois, have invented certain new and useful Improvements in Automobile Signaling Apparatuses, of which the following is a specification.

The main objects of this invention are to provide an improved signaling apparatus adapted to be carried by motor propelled vehicles for the purpose of indicating in advance to pedestrians and others the direction in which the operator of the vehicle intends to turn at the next crossing, and adapted to also give a corresponding indication to vehicles approaching from behind; to provide a device of this class in which the front signal is of such character that it will be unmistakably understood by pedestrians without requiring that the latter be familiar with a prearranged code; and to provide a device of this character in which the rear signal device may be a simple arrangement of lights comprising or associated with the tail light of a vehicle.

The present invention is illustrated in the accompanying drawings in a form which is suitable for use on a motor driven vehicle, such as an automobile.

Figure 1 is a top plan showing the general arrangement of the signaling apparatus as applied to an automobile; Fig. 2 is a front elevation of the front signaling device; Fig. 3 is a diagram illustrating a suitable arrangement of electric connections; Fig. 4 is a detail illustrating a suitable arrangement of contacts in the electrical circuits; Fig. 5 is a face view of the dial of the indicator.

In the form shown in the drawings the apparatus comprises a front signaling device A, a rear signaling device B, and a controlling device C, together with suitable electrical connections for operating the lights of the front and rear signaling devices.

The front signaling device A comprises a supporting frame 1, which is arranged to be attached to the front of the radiator or engine hood of an automobile, and which has mounted therein a rotatable hollow sign casing 2 having three transparent panels which are provided with characters which can be plainly read from the front to indicate a proposed change in the direction of the course of the vehicle. For example, these characters may consist of the words "Straight ahead," "Turning to right," "Turning to left," or other words of similar import, and it is also desirable that in addition to the words "Right" and "Left" the signs shall also be provided with arrows pointing in those directions. The interior of the casing 2 is illuminated by means of one or more electric lamps, represented in the drawings by the lamp 4, and it is also provided with suitable operating mechanism which will be hereinafter described, whereby it may be rotated to bring different sign panels to the front.

The rear signal device comprises a suitable support upon which are mounted three lamps arranged in a row side by side, the middle lamp 5 being preferably a red light to serve the function of the ordinary tail light, and at each side thereof are white or other colored lights 6 and 7, of such color as to be clearly distinguishable from the red light 5.

Conveniently located near the operator of the vehicle, as for instance on the dashboard, there is mounted the controlling device C, which, in the form shown, is a dial 8 and an arm 9 provided with a handle whereby it may be rotated, and also provided with a pointer which coacts with the dial to indicate the position of the handle and also the signal indications for which it is set; for example, when the handle is in the vertical plane the pointer will point to S, signifying that the signal indicates "Straight ahead." If the handle is thrown to the left or right it will point to a corresponding symbol on the dial. Suitable means are also provided to assist in the quick and accurate setting of the handle, such means being indicated in the drawings as a spring pressed detent 10, coacting with notches 11 in the periphery of a hub or disk on the shaft which carries the arm 9. The arm 9 is connected by a shaft 12 to the mechanism which rotates the casing 2, which, in the form shown, is a train of gears.

The electrical connections are indicated in Figs. 3 and 4, and comprise, besides the lamps 4, 5, 6, and 7, a battery 13, a cut out switch 14, a row of stationary brushes 15, 16, and 17, and circuit making and breaking contacts carried by the casing 2. The casing 2 is carried by a pair of stationary shafts 18 at its opposite ends, and these are hollow and serve as conduits for the conductors leading into the interior of the casing 2. The circuits, as indicated diagrammatically in Fig. 3, are so arranged that the lights 4 and 5 will at all times be in circuit when the switch 14 is closed, but the lights 6 and 7 will be controlled by the position of the casing 2 so that the light 6 will glow when the casing 2 is in position to indicate that the vehicle will turn to the right, whereas the light 7 will glow when the casing is in position to indicate that the vehicle will turn to the left. The contacts for accomplishing this result may consist of a slip ring 19, carried by the casing 2 and coacting with the stationary brush 15. The light 6 is connected in circuit with the battery 13, by means of the brush 16 and a contact 20 carried by the casing 2, and adapted to engage the brush 16 when the corresponding panel of the casing 2 faces to the front. The contact 20 is in circuit with the slip ring 19, as is illustrated diagrammatically by the conductor 21. Similarly a contact 22, also connected to the slip ring 19, engages the brush 17 and completes the circuit through the lamp 7 when the corresponding panel of the casing 2 faces to the front. It is obvious that a similar result might be obtained by having the contacts, which control the various circuits, arranged to be controlled directly by the handle 9, but it is preferred to have the contacts within the casing 2, since such an arrangement prevents any likelihood of mistakes in re-assembling the parts of the signaling apparatus in case its gearing be temporarily disconnected for the purpose of repair, and also avoids the necessity of providing a separate housing for the contacts.

The operation of the device shown is as follows: As long as the operator of the vehicle intends to drive straight ahead he allows the handle 9 to remain with the indicator at S, which corresponds to the position of the casing 2 which indicates "Straight ahead", and which cuts out both of the rear signal lights 6 and 7 leaving only the tail light 5 visible. When the operator approaches a corner at which he intends to turn, he throws the lever 9 toward the corresponding side and thus gives warning of his intention to pedestrians in front of the vehicle. The setting of the casing operates the controlling contacts and causes the light 6 or 7, as the case may be, to glow, and thereby also gives warning to a vehicle approaching from the rear not to pass on the side toward which the signaling vehicle will turn.

Although but one specific embodiment of this invention has been herein shown and described, it will be understood that numerous details of the construction shown may be altered or omitted without departing from the spirit of this invention as defined by the following claims.

I claim:

1. The combination with a vehicle, of a front signal device adapted to be set to indicate in advance changes in the course of the vehicle and a rear signal device comprising a series of tail lights adapted to be displayed in different arrangements to indicate changes in the direction of the vehicle corresponding to those of said front signal device, means controlled from the seat of the operator for operating said front signal device, and a series of electrical contacts controlling said tail lights and being movable through the act of changing the indication of said front signal device.

2. The combination with a vehicle, of a front signal device adapted to be set to indicate in advance changes in the course of the vehicle and a rear signal device comprising a series of tail lights adapted to be displayed in different arrangements to indicate changes in the direction of the vehicle corresponding to those of said front signal device, means controlled from the seat of the operator for operating said front signal device, said front signal device being provided with electrical contacts for controlling said tail lights through movements of said front signal device.

Signed at Chicago this 12th day of October 1912.

JOSEPH L. CAYER.

Witnesses:
 EUGENE A. RUMMLER,
 EDWIN PHELPS.